United States Patent
Scheelke

(10) Patent No.: US 7,242,316 B2
(45) Date of Patent: Jul. 10, 2007

(54) DEVICE CONTROL APPARATUS AND METHOD

(75) Inventor: Erik Scheelke, Cupertino, CA (US)

(73) Assignee: Digital Deck, Inc., Redwood, CA (US)

( * ) Notice: Subject to any disclaimer, the term of this patent is extended or adjusted under 35 U.S.C. 154(b) by 0 days.

(21) Appl. No.: 10/845,670

(22) Filed: May 14, 2004

(65) Prior Publication Data

US 2005/0022244 A1    Jan. 27, 2005

Related U.S. Application Data

(60) Provisional application No. 60/470,769, filed on May 14, 2003.

(51) Int. Cl.
*H04N 7/16* (2006.01)

(52) U.S. Cl. .................... 340/825.24; 340/825.25; 725/78

(58) Field of Classification Search .......... 340/825.24, 340/825.25, 528.22; 725/78, 79, 80, 81; 348/705, 706; 370/62, 356, 362
See application file for complete search history.

(56) References Cited

U.S. PATENT DOCUMENTS

| | | | |
|---|---|---|---|
| 5,193,208 A | 3/1993 | Yokota et al. ................ 455/4.1 |
| 5,452,291 A | 9/1995 | Eisenhandler et al. ........ 370/54 |
| 5,666,645 A | 9/1997 | Thomas et al. ............... 455/6.1 |
| 5,682,206 A | 10/1997 | Webmeyer et al. .......... 348/563 |
| 6,029,195 A | 2/2000 | Herz .......................... 709/219 |
| 6,037,933 A | 3/2000 | Blonstein et al. ............ 345/327 |
| 6,177,931 B1 | 1/2001 | Alexander et al. ........... 345/327 |
| 6,255,961 B1 | 7/2001 | Van Ryzin et al. ...... 340/825.25 |
| 6,263,503 B1 | 7/2001 | Margulis ....................... 725/81 |
| 6,305,018 B1 | 10/2001 | Usui et al. ..................... 725/49 |
| 6,323,911 B1 | 11/2001 | Schein et al. ................ 348/552 |
| 6,388,714 B1 | 5/2002 | Schein et al. ................ 348/563 |
| 6,452,923 B1 | 9/2002 | Gerszberg et al. ........... 370/352 |
| 6,466,971 B1 | 10/2002 | Humpleman et al. ........ 709/220 |
| 6,469,753 B1 | 10/2002 | Klosterman et al. ......... 348/906 |
| 6,490,443 B1 | 12/2002 | Freeny, Jr. ................... 455/406 |
| 6,505,348 B1 | 1/2003 | Knowles et al. ............... 725/49 |
| 6,510,152 B1 | 1/2003 | Gerszberg et al. ........... 370/352 |
| 6,594,688 B2 | 7/2003 | Ludwig et al. .............. 709/204 |
| 6,611,537 B1 * | 8/2003 | Edens et al. ................. 370/503 |
| 6,637,029 B1 | 10/2003 | Maissel et al. ................ 725/46 |
| 6,678,891 B1 | 1/2004 | Wilcox et al. ................. 725/42 |
| 6,684,399 B1 | 1/2004 | Grooters ....................... 725/48 |
| 6,694,352 B1 | 2/2004 | Omoigui ...................... 709/205 |
| 6,704,028 B2 | 3/2004 | Wugofski .................... 345/719 |
| 6,721,955 B2 | 4/2004 | Khoo et al. .................... 725/46 |
| 6,756,997 B1 | 6/2004 | Ward, III et al. ............ 345/716 |
| 6,804,705 B2 | 10/2004 | Greco et al. ................. 709/219 |
| 6,865,746 B1 | 3/2005 | Herrington et al. ........... 725/53 |
| 6,898,762 B2 | 5/2005 | Ellis et al. ................... 715/716 |
| 2002/0120932 A1 | 8/2002 | Schwalb ....................... 725/37 |
| 2003/0028887 A1 | 2/2003 | Frouin et al. ................. 725/78 |
| 2004/0019908 A1 | 1/2004 | Williams et al. .............. 725/46 |
| 2005/0086687 A1 | 4/2005 | Omoigui ...................... 725/35 |
| 2006/0098638 A1 * | 5/2006 | Binder ........................ 370/356 |

* cited by examiner

FOREIGN PATENT DOCUMENTS

EP    1 187 348 A2    3/2002

*Primary Examiner*—Edwin C. Holloway, III
(74) *Attorney, Agent, or Firm*—Morrison & Foerster LLP

(57) ABSTRACT

An apparatus and method of distributing media content from a hardware input device to a hardware output device, located remotely from each other, in a home network, is disclosed. A control unit receives a user input and converts it to a control signal. An encoder device is coupled to the input device and a decoder device is coupled to the output device. The encoder device and the decoder device each receive the control signal. The encoder device digitally encodes an analog signal from the input device and transmits the encoded signal over the network to the decoder device. The decoder device translates the encoded signal into a decoded signal suitable for the output device.

34 Claims, 3 Drawing Sheets

DEVICE CONTROL APPARATUS AND METHOD

RELATED APPLICATIONS

This Patent Application claims priority under 35 U.S.C. 119 (e) of the co-pending U.S. Provisional Patent Application, Ser. No. 60/470,769, filed May 14, 2003, and entitled "DEVICE CONTROL". The Provisional Patent Application, Ser. No. 60/470,769, filed May 14, 2003, and entitled "DEVICE CONTROL" is also hereby incorporated by reference.

FIELD OF THE INVENTION

The present invention relates generally to content distribution in a home network. More specifically, the present invention relates to a system and method of distributing media content from a hardware input device to a hardware output device, located remotely, within a home network.

BACKGROUND OF THE INVENTION

Modern homes contain multiple consumer electronic devices that can benefit from interconnection to other electronic devices in the home, for example, displaying the output of a DVD player located in a living room on a television located in a bedroom separated by one or more walls. As the number of interoperable electronic devices in the home environment increases, the need arises for a way to distribute media content from an existing source device to an existing destination device located remotely in the home and to allow the devices to interact remotely.

Most prior art schemes that distribute media content within a home network are relegated to simply downloading digital content off the Internet and displaying it on a personal computer. This scheme restricts access to other media content sources located in the home or to devices that connect the home to external access networks, including TVs, VCRs, set-top boxes, video game consoles and other audio/video devices.

A problem encountered when attempting to distribute analog signals from legacy hardware input sources, such as a DVD player, to remotely located legacy hardware output sources, such as a TV located in a different room, is that the hardware input sources need to be directly connected to the hardware output sources. This configuration limits utilization of input sources and requires additional wiring and components. Legacy hardware switch devices, such as receivers and tuners, can provide switching of media signals. However, these devices work only in an analog domain and are generally limited to devices in close geographic proximity to the switch. Thus these switches do not offer a way to distribute the media content to all areas of the home.

What is needed is a system for and method of distributing media content from a hardware input device to a hardware output device, located remotely, within a home network.

SUMMARY OF THE INVENTION

The present invention discloses an apparatus and method of distributing media content from a content source device to a content destination device within a digital home network. The present invention couples hardware input devices such as DVD players, CD players, VCRs and other content sources with hardware output devices such as televisions and display screens, utilizing the home network as a conduit for the content distribution. The present invention overcomes the drawbacks of requiring additional wiring and components to connect input devices with output device. The present invention also overcomes the drawbacks of using legacy hardware switch devices, such as receivers and tuners, to provide switching of media signals.

In accordance with one embodiment of the present invention, an apparatus for distributing media content from a hardware input device to a hardware output device, located remotely from each other, in a home network, is disclosed. The apparatus includes a control unit receiving a user input and converting it to a control signal. The apparatus also includes an encoder device coupled to the input device and receiving the control signal. The apparatus also includes a decoder device coupled to the output device and receiving the control signal. The encoder device preferably digitally encodes an analog signal from the input device and transmits the encoded signal over the network to the decoder device. The decoder device preferably translates the encoded signal into a decoded signal suitable for the output device.

The network can be one of a local area network, a wide area network and a cable network. The network 110 is preferably a digital network. The digital network can be wireless. Alternatively The encoder device can include a infra-red transmitter for sending control signals to the input device. The decoder device can include an infra-red transmitter for sending control signals to the output device. The decoder device can also include an infra-red receiver for receiving user generated command signals from a remote control. The decoder device can further display on-screen graphic on the output device for user interface elements. The interface elements can comprise menus.

The input device can comprise at least one of: a DVD player, a CD player, a VCR, and a stereo. The output device can comprise at least one of: a television, a display screen, and speakers.

In accordance with another embodiment of the present invention, a method of distributing media content from a hardware input device to a hardware output device, located remotely from each other, in a home network, is disclosed. The method comprises the step of converting a user input to a control signal. The method further comprises the step of transmitting the control signal to an encoder device and a decoder device. The method also comprises the step of digitally encoding an analog signal from the input device. The method also comprises the steps of transmitting the encoded signal over the network to the decoder device; and translating the encoded signal into a decoded signal suitable for the output device.

DETAILED DESCRIPTION OF A PREFERRED EMBODIMENT

Figure 1:
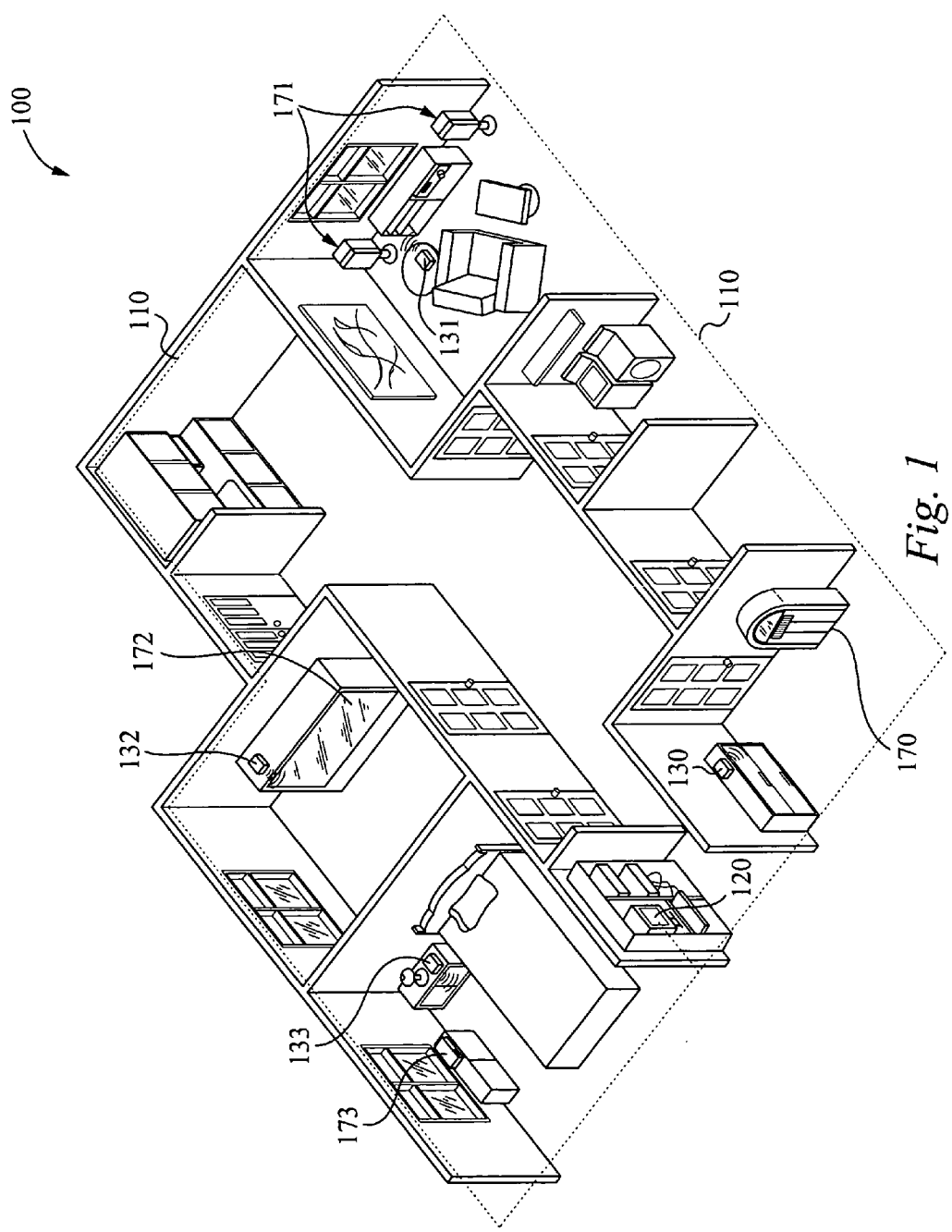
FIG. 1 shows an apparatus for distributing media content remotely in a home network in accordance with the present invention.

FIG. 1 illustrates one embodiment of an apparatus 100 for distributing media content from at least one hardware input device to at least one hardware output device, located remotely from each other in separate rooms, in a home network, in accordance with the present invention. The apparatus 100 includes a network 110, a control processor or control unit 120, encoder devices 130 and 133, and decoder devices 131 and 132. The encoder devices 130 and 133 are coupled to hardware input devices 170 and 173, respectively. The decoder devices 131 and 132 are coupled to hardware output devices 171 and 172, respectively. The input device 170, for example, is a CD jukebox. The input device 173 is a DVD player. The output device 171 is a speaker system. The output device 172 is a television. Alternatively, the input devices 170 and 173 can be any legacy hardware input device. Similarly, the output devices 171 and 172 can be any legacy hardware output devices. In this embodiment, the devices 170-173 are separated by one or more walls. The network can be one of a local area network, a wide area network and a cable network. The network 110 is preferably a digital network. The digital network can be wireless. Alternatively, the digital network can be wired. The digital network can also be a powerline.

The control unit 120 controls the devices 170-174 according to commands from a user with a wireless remote. The control unit 120 couples the input devices 170 and 173 with the output devices 171 and 172 utilizing the network 110 as a conduit for content distribution. The control unit 120 also provides control logic to the encoder devices 130 and 133 and the decoder devices 131 and 132. The control unit 120 receives commands from the user and sends appropriate control signals to at least one of the encoder devices 130 and 133 and at least one of the decoder devices 131 and 132 to execute the user's requests.

At least one of the encoder devices 130 and 133 receives the control signal from the control unit 120. The encoder devices 130 and 133 preferably include an infra-red transmitter (not shown) to send control signals to the input devices 170 and 173. The encoder devices 130 and 133 receive analog signals from the input devices 170 and 173 and convert them into digital signals or digital media streams such as MPEG2 or MPEG4. Thus, the encoder devices 130 and 133 digitally encode the analog signals from the input devices 170 and 173 and transmit the encoded signal over the network 110 to the decoder devices 131 and 132.

At least one of the decoder devices 131 and 132 receives the control signal from the control unit 120. The decoder devices 131 and 132 also receive the encoded signal from the encoder devices 130 and 133 and translate the encoded signal into a decoded signal suitable for the output devices 171 and 172. The decoded signal can be an analog audio signal or a analog video signal. The decoder devices 131 and 132 preferably include an infra-red transmitter (not shown) to send control signals to the output devices 171 and 172 and an infra-red receiver (not shown) to receive user generated command signals from a remote control, such as "channel change", "fast-forward", "stop", "pause", volume up/down, and other command signals. Further, the decoder devices 131 and 132 preferably display on-screen graphics on the output devices 171 and 172 for user interface elements such as menus.

Figure 2:
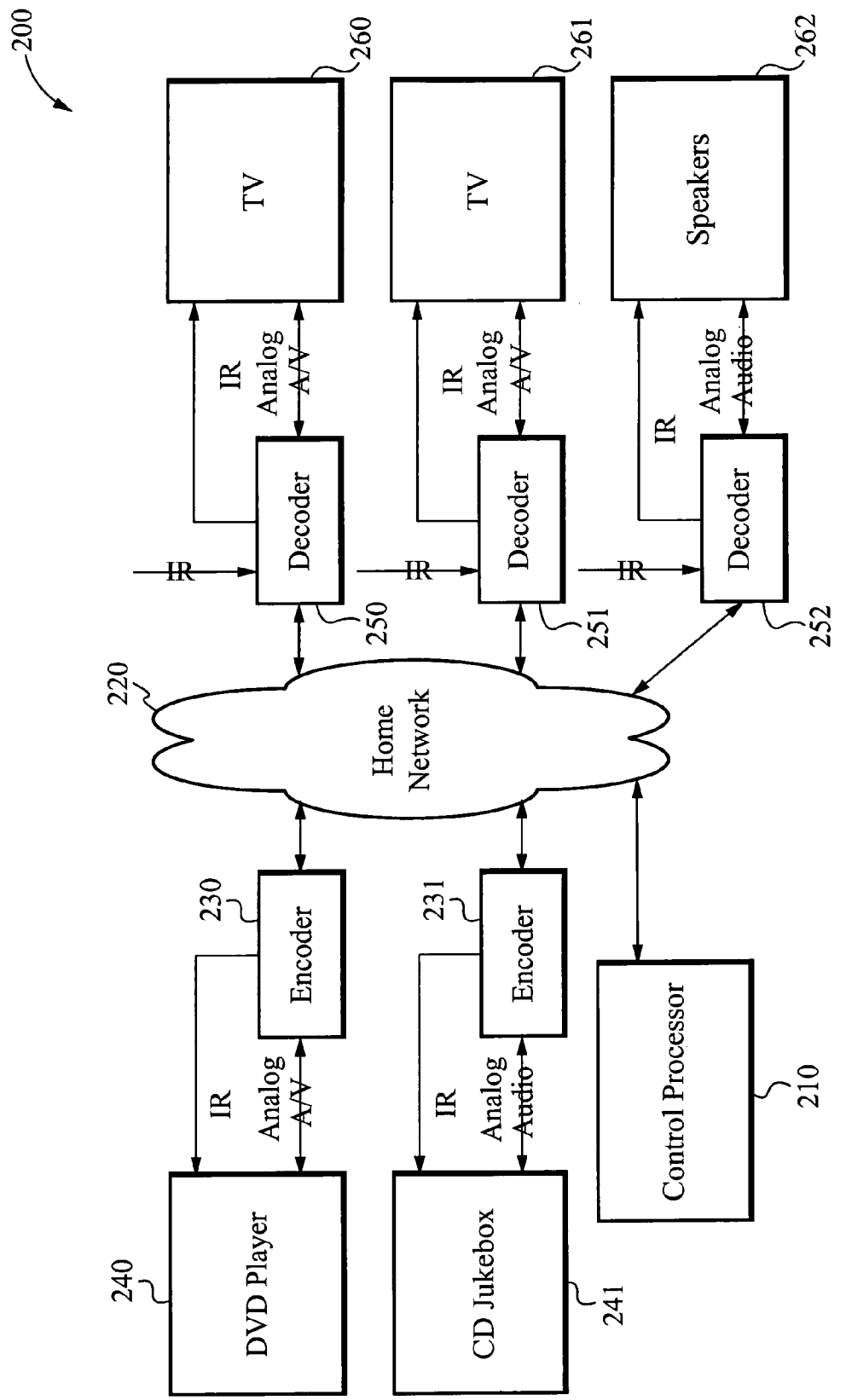
FIG. 2 is a block diagram of an apparatus for distributing media content remotely in a home network in accordance with the present invention.

FIG. 2 is a block diagram of an apparatus 200 for distributing media content remotely in a home network in accordance with one embodiment of the present invention.

A control unit 210 receives user command signals from a wireless remote and distributes the signals to at least one of the encoder devices 230 and 231 and at least one of the decoder devices 250, 251, and 252 to execute the user's requests. The control unit 210 provides control logic to the encoder devices 230 and 231 and the decoder devices 250-252, which are coupled via a network 220. The network 220 can be a digital network such as a wireless network, a wired network, or a powerline. Each encoder device 230 and 231 is coupled to at least one hardware input device, as shown. For example, the encoder device 230 controls and is coupled to a DVD player 240. The encoder device 231 controls and is coupled to a CD Jukebox 241. Each encoder device 230 and 231 preferably includes an infra-red transmitter (not shown) for sending control signals to each input device 240 and 241. The encoder devices 230 and 231 receive analog signals from the input devices 240 and 241 and digitally encode and transmit the signals to the decoder devices 250-252.

Each decoder device 250-252 is coupled to at least one hardware output device, as shown. For example, the decoder device 250 controls and is coupled to a television 260. The decoder device 251 controls and is coupled to a television 261. The decoder device 252 controls and is coupled to a speaker system 262. The decoder devices 250-252 receive the encoded signals from the encoder devices 230 and 231 via the network 220. The decoder devices 250-252 then translate the encoded signals into decoded signals suitable for the output devices 260-262. Each decoder device 250-252 preferably includes both an infra-red transmitter (not shown) for sending control signals to the output devices 260-262 and an infra-red receiver (not shown) for receiving user generated command signals from a remote control, such as "channel change", "fast-forward", "stop", "pause", "volume up/down", and other command signals. Further, each decoder device 250-252 preferably displays on-screen graphics on the output devices 260-262 for use interface elements such as menus.

As an example of how the present invention can be performed, in accordance with one embodiment of the present invention and FIG. 2, when a user chooses to play content from an input device on a remotely located output device, the user turns on the television 260 using an infra-red (IR) remote and presses a "menu" button on the remote. The decoder device 250, which is coupled to the television 260 and the network 220, receives the IR signal. The decoder device 250 transmits a signal to the control unit 210 that the "menu" button was pressed. The control unit 210 transmits a control signal to the decoder device 250 to display a graphic menu. In this example, the graphic menu displays the DVD player 240 and the CD Jukebox 241. The user selects to play the DVD player 240, for example, using the remote control. An IR signal is generated from the user and is received by an IR receiver (not shown) of the decoder device 250. The decoder device 250 transmits a signal to the control unit 210 indicating the DVD player 240 was selected. The control unit 210 then sends a signal to the encoder device 230 coupled to the DVD player 240 to transmit its digital stream to the decoder device 250. The control unit 210 also sends a signal to the decoder device 250 to start displaying the digital stream it is receiving from the encoder device 230 on the television 260. The encoder device 230 then sends control signals to the DVD player via an infra-red transmitter to command the DVD player 240 to play a DVD. The DVD player 240 plays the DVD and sends its audio and visual media to the encoder device 230. The encoder device 230 encodes the media and transmits it through the network 220 to the decoder device 250. The decoder device 250 decodes the media and sends the audio and video signals to the television 260 which displays content.

Figure 3:
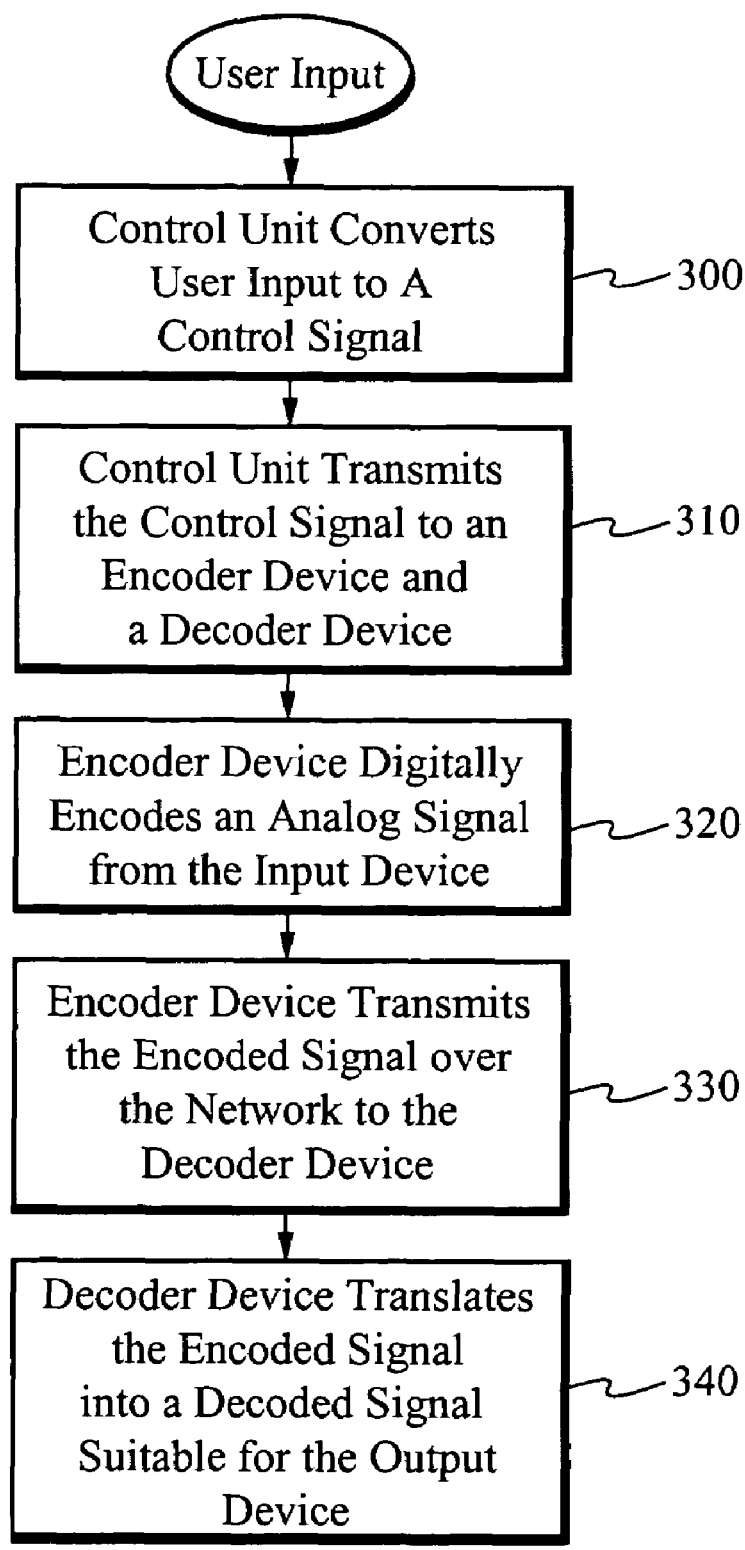
FIG. 3 is a flow chart illustrating a method of distributing media content remotely in a home network in accordance with the present invention.

FIG. 3 is a flow chart illustrating a method of distributing media content from a hardware input device to a hardware output device, located remotely from each other, in a home network, in accordance with the present invention. In the step 300 a control unit receives user input from a wireless remote and converts the user input to a control signal. Next, in the step 310, the control unit transmits the control signal to an encoder device and a decoder device. Next, in the step 320, the encoder device encodes an analog signal from an input device. Next, in the step 330, the encoder device transmits the encoded signal over the network to the decoder device. Next, in the step 340, the decoder device translates the encoded signal into a decoded signal suitable for an output device.

This invention has been described in terms of specific embodiments incorporating details to facilitate the understanding of the principles of construction and operation of the invention. Such reference herein to specific embodiments and the details thereof is not intended to limit the scope of the claims appended hereto. It will be apparent to those of ordinary skill in the art that modifications can be made in the embodiment chosen for illustration without departing from the spirit and scope of the invention.

What is claimed is:

1. An apparatus for distributing media content from hardware input devices to hardware output devices, located remotely from each other, in a home network, the apparatus comprising:
  a. a control unit receiving user input and converting the user input to control signals;
  b. at least two encoder devices, each coupled to a hardware input device and configured to receive the control signals, at least one of the at least two encoder devices including an infrared transmitter for sending infra red control signals to its respective hardware input device; and
  c. at least two decoder devices, each coupled to a hardware output device and configured to receive control signals at least one of the at least two decoder devices including an infrared transmitter for sending infra red control signals to its respective hardware output device;
  wherein the control unit couples each encoder device with an appropriate decoder device, and wherein each encoder device digitally encodes an analog audio/video signal from its coupled input device to form an encoded signal and transmits the encoded signal over the home network to its coupled decoder device, and wherein each coupled decoder device translates the encoded signal into a decoded signal suitable for the output device coupled to that coupled decoder device, and wherein at least two of the encoder devices are remote from each other on the home network.

2. The apparatus of claim 1 wherein at least one input device is a DVD player.

3. The apparatus of claim 1 wherein at least one input device is a CD player.

4. The apparatus of claim 1 wherein at least one input device is a VCR.

5. The apparatus of claim 1 wherein at least one input device is a stereo.

6. The apparatus of claim 1 wherein at least one decoder device includes an infra-red receiver for receiving user generated command signals from a remote control.

7. The apparatus of claim 1 wherein at least one decoder device displays on-screen graphics on its coupled output device for user interface elements.

8. The apparatus of claim 7 wherein the interface elements comprise menus.

9. The apparatus of claim 1 wherein at least one output device is a television.

10. The apparatus of claim 1 wherein at least one output device is a display screen.

11. The apparatus of claim 1 wherein at least one output device is a speaker.

12. The apparatus of claim 1 wherein the home network is one of a local area network, a wide area network, and a cable network.

13. The apparatus of claim 1 wherein the home network is a digital network.

14. The apparatus of claim 13 wherein the digital network is wireless.

15. The apparatus of claim 13 wherein the digital network is wired.

16. The apparatus of claim 13 wherein the digital network is a powerline.

17. A method of distributing media content from hardware input devices to hardware output devices, located remotely from each other, in a home network, the method comprising the steps of:
  converting user input to control signals;
  transmitting at least two of the control signals to at least two encoder devices and transmitting at least another two of the control signals to at least two decoder devices;
  sending infrared control signals from at least one encoder device to a respective hardware input device;
  digitally encoding analog audio/video signals from the hardware input devices;
  transmitting the encoded signals over the home network to the decoder devices;
  translating the encoded signals into decoded signals suitable for the output devices and;
  sending infrared control signals from at least one decoder device to a respective hardware output device,
  wherein at least two of the encoder devices are remote from each other on the home network.

18. The method of claim 17 wherein at least one encoder device includes an infra-red transmitter for sending control signals to the input device.

19. The method of claim 17 wherein at least one input device is a DVD player.

20. The method of claim 17 wherein at least one input device is a CD player.

21. The method of claim 17 wherein at least one input device is a stereo.

22. The method of claim 17 wherein at least one decoder device includes an infra-red receiver for receiving user generated command signals from a remote control.

23. The method of claim 17 wherein at least one decoder device displays on-screen graphics on at least one output device for user interface elements.

24. The method of claim 23 wherein the interface elements comprise menus.

25. The method of claim 17 wherein at least one output device is a television.

26. The method of claim 17 wherein at least one output device is a display screen.

27. The method of claim 17 wherein at least one output device is a speaker.

28. The method of claim 17 wherein the home network is one of a local area network, a wide area network, and a cable network.

29. The method of claim 17 wherein the home network is a digital network.

30. The method of claim 29 wherein the digital network is wireless.

31. The method of claim 29 wherein the digital network is wired.

32. The method of claim 29 wherein the digital network is a powerline.

33. An apparatus for distributing media content from hardware input devices to hardware output devices, located remotely from each other, in a home network, the apparatus comprising:
  a. a control unit configured for receiving user input, converting the user input to control signals, and sending the control signals over the home network;
  b. one or more encoder devices, each coupled to a hardware input device and configured to receive control signals from the control unit over the home network and each including an infrared transmitter for sending infra red control signals to its respective hardware input device; and
  c. one or more decoder devices, each coupled to a hardware output device and configured to receive control signals from the control unit over the home network and each including an infrared transmitter for sending infra red control signals to its respective hardware output device;

wherein the control unit couples each encoder device with an appropriate decoder device, and wherein each encoder device digitally encodes an analog audio/video signal from its coupled input device to form an encoded signal and transmits the encoded signal over the home network to its coupled decoder device, and wherein each coupled decoder device translates the encoded signal into a decoded signal suitable for the output device connected to that coupled decoder device.

34. A method of distributing media content from hardware input devices to hardware output devices, located remotely from each other, in a home network, the method comprising the steps of:
  converting user input to control signals at a control unit;
  transmitting control signals from the control unit to one or more encoder devices and other control signals from the control unit to one or more decoder devices over the home network,
  sending infrared control signals from at least one of the one or more encoder devices to a respective hardware input device;
  digitally encoding analog audio/video signals from the hardware input devices by the encoder devices;
  transmitting the encoded signals over the home network to the decoder devices;
  translating the encoded signals into decoded signals suitable for the output devices by the decoder devices and;
  sending infrared control signals from at least one of the one or more decoder devices to a respective hardware output device.

* * * * *